D. A. WOODBURY.
CROSS-HEADS FOR STEAM ENGINES.
No. 194,207. Patented Aug. 14, 1877.
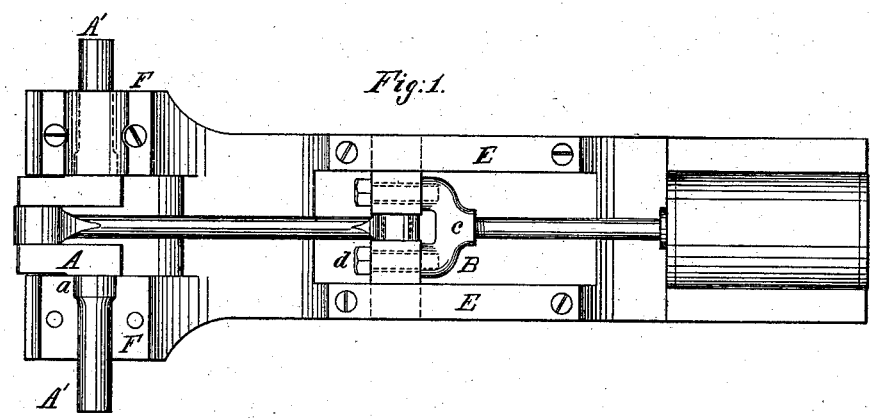
WITNESSES.
Wm A. Montgomery
Wm J. Creelman
INVENTOR.
D A Woodbury

UNITED STATES PATENT OFFICE.

DANIEL A. WOODBURY, OF ROCHESTER, NEW YORK.

IMPROVEMENT IN CROSS-HEADS FOR STEAM-ENGINES.

Specification forming part of Letters Patent No. 194,207, dated August 14, 1877; application filed May 3, 1877.

*To all whom it may concern:*

Be it known that I, DANIEL A. WOODBURY, of Rochester, in the county of Monroe and State of New York, have invented a certain new and Improved Cross-Head for Steam-Engines, of which the following is a specification:

My invention consists, chiefly, in constructing a cross-head in two parts, whereby I obtain certain advantages, hereinafter named.

In the drawings, Figure 1 is a plan view of my invention. Figs. 2 and 3 are enlarged views, showing details.

A, Fig. 1, is the crank-shaft, B the cross-head, and E the slides, of a steam-engine.

The cross-head B, as to general outlines, may be made in the usual form, having slide-bearings $b$, wrist $e$, and arch $c$, Fig. 2. Instead, however, of casting it one piece, as is the common practice, I make it into two parts—viz., the body $b\ e$ and arch $c$—the division being transverse to the line of reciprocation. The adjoining surfaces of these parts are planed or otherwise dressed true, and apertures are made through the body $b\ e$ to receive the bolts $d$, which are screwed into the arch $c$, as shown in Fig. 3. These apertures are somewhat larger than the bolts, as indicated in dotted lines, and it is plain that thereby any difference in the alignment of the cylinder and slides, occurring either when the engine is erected or afterward, when the parts are worn, will be compensated, and it is only necessary to slack the bolts $d$, and allow the parts to adjust themselves, to effect such alignment.

Of necessity the bolts $d$ must be kept tightly screwed up to prevent them from becoming loose when the engine is running, and it might be desirable in some cases to fill the spaces around them in the body $b\ e$ with a soft metal-like lead or Babbitt metal, which can be easily done after the engine is erected and the parts properly adjusted.

Another advantage which I gain by dividing the cross-head is, that the wrist $e$ may be turned in a lathe, as indicated by the position of the centers in Fig. 3. Hitherto these wrists have been filed to the cylindrical form, as it was not practicable to turn them when the cross-head was in one piece.

I do not wish to be confined to the method of fastening the parts herein shown, consisting of the bolts $d$, as other modes of performing that function may be devised equally good, or perhaps better.

What I claim as my invention, and desire to secure by Letters Patent, is—

A cross-head for a steam-engine, made in two parts, the guide-wings $b$ and wrist $e$ constituting one portion, and the arch $c$, to which the piston rod is attached, the other, said parts being suitably secured together, substantially as and for the purposes set forth.

D. A. WOODBURY.

Witnesses:
   WM. A. MONTGOMERY,
   W. J. CREELMAN.